No. 896,845. PATENTED AUG. 25, 1908.
C. D. MENEELY.
TRANSFER TICKET.
APPLICATION FILED MAY 2, 1907.
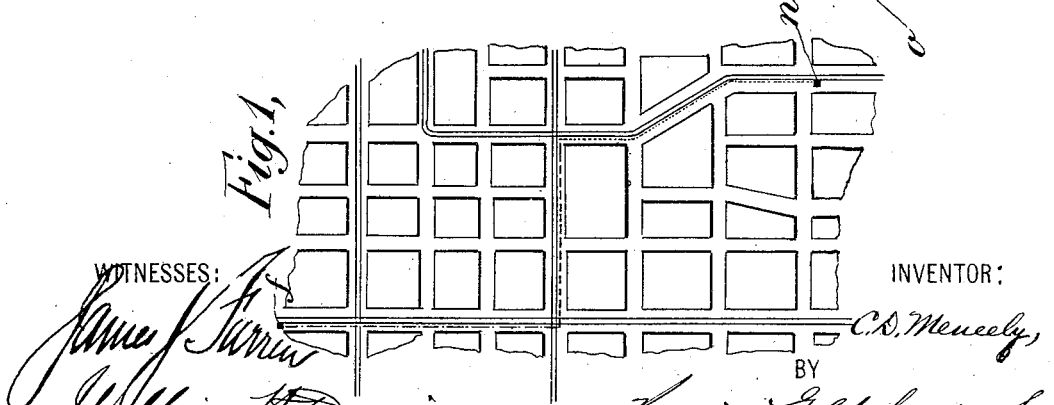

UNITED STATES PATENT OFFICE.

CHARLES D. MENEELY, OF HEMPSTEAD, NEW YORK.

TRANSFER-TICKET.

No. 896,845.  Specification of Letters Patent.  Patented Aug. 25, 1908.

Application filed May 2, 1907. Serial No. 371,389.

*To all whom it may concern:*

Be it known that I, CHARLES D. MENEELY, a citizen of the United States, residing at Hempstead, in the county of Nassau and State of New York, have invented certain new and useful Improvements in Transfer-Tickets; and I do hereby declare the following to be a full, clear, and exact description of the invention, such as will enable others skilled in the art to which it appertains to make and use the same.

My invention relates to a system of primary and secondary transfer tickets for passenger traffic upon urban and suburban surface, subway or elevated lines, and the like.

It is designed to furnish to the passenger receiving the primary transfer ticket at the time he pays his cash fare an indication of the shortest route between any two given points upon the system of intersecting lines and junctions controlled by, or operated in conjunction with the line issuing the ticket; so that, in those instances where, by statute or custom, it is incumbent upon the corporation operating a system of intersecting lines to convey a passenger, for a single fare, from any one point of the system to any other point thereof, the passenger will be able to ascertain at once from an inspection of the primary transfer ticket his shortest and most convenient itinerary. The primary transfer ticket, therefore, provides the passenger with the desired information for the reasonable use of the intersecting lines in arriving at his destination, and the unreasonable use of the primary ticket is guarded against, as will hereinafter appear, by providing for its collection as soon as it has subserved the purpose for which it is intended.

The secondary transfer ticket is received by the passenger at the time he surrenders the first transfer ticket to the conductor of the line to which the passenger first transfers, and is subsequently surrendered by him to the conductor of the line of final transfer. The system, therefore, constitutes an efficient safeguard to the interests of the company not only to the extent of restricting the passenger to the reasonable use of the lines, but also because it contemplates the registration of the transfers,—an expedient which is practically indispensable to a close supervision of the service.

In carrying out my invention, I provide the primary transfer ticket with the name of the issuing line, which name printed prominently upon the ticket identifies it as one which is given by the conductor to a passenger paying a cash fare upon his car. The printing of the name of the issuing line not only identifies the origin of the primary transfer ticket, for auditing purposes, but also prevents its re-use upon the same line at any point thereof, and, for convenience, and as is usual, the primary ticket will be provided with the customary time limit notation, determining the period within which it can be used upon an intersecting line or at junctions.

In addition to the name of the issuing line, the primary ticket contains a main list of the names of the lines to which the issuing line transfers at intersections or junctions. It further contains a secondary list or itinerary of the lines to which the main list transfers at intersections or junctions. Furthermore, each line of the main list referred to is provided with a distinguishing individual numeral or like designation, and each line of the secondary list is provided with a series of numbers associated with it, which numbers correspond to the individual designating numbers of the lines of the main list, to which it transfers. It is, therefore, entirely feasible for a passenger, on receiving the primary transfer ticket, upon the payment of a cash fare, to ascertain which line of the main list he must select in order to arrive, by the shortest route, at the intersection or junction of the second transfer line leading to his destination.

In the use of the primary ticket, it is contemplated that it shall be surrendered to the conductor of the line to which the first transfer is made, and the said conductor will thereupon issue to the passenger a secondary transfer having printed prominently upon it the name of the line issuing the secondary transfer and also a list of the lines (with their designating numerals), to which it transfers, which list, of course, will contain the name and designating numeral of the line issuing the primary transfer. The conductor, upon issuing the secondary transfer ticket, will punch from it the numeral corresponding to the line which issued the primary transfer received by him. The subsequent collection of the secondary transfer deprives the passenger of any pretense that he is entitled to further passage upon the lines of the company, and ends his journey save in those instances where the company permits the conductor to issue a further transfer to additional points without the payment of extra fare or where it has street agents stationed at the points of additional transfer, whose duty it is to issue such further transfers.

In the accompanying drawing, Figure 1 represents diagrammatically a portion of a system of intersecting tramways; Fig. 2 represents the obverse side of the primary transfer ticket; and Fig. 3 represents the obverse and reverse sides of the auxiliary transfer ticket, to be employed in conjunction therewith.

Referring to the drawing, and particularly to the primary transfer ticket shown in Fig. 2, $o$ indicates the portion of the ticket which is provided with the name of the issuing line, which, in this instance, we may assume is the Bushwick avenue line.

$b$ indicates the portion of the ticket which contains the so-called main list, or list of lines to which the issuing line directly transfers. As shown, this main list is alphabetically arranged, and each individual line of the main list is designated by a different numeral appropriated to it.

$c$ indicates the portion of the ticket which contains the so-called itinerary, and is provided with the names of the lines to which one or more of the lines in the main list transfer. This itinerary is likewise preferably arranged in alphabetical order and opposite the several members of the secondary list are arranged numerals which correspond to and indicate the lines of the main list which transfer to it.

In Fig. 3, the secondary ticket therein shown is provided with a portion $d$ indicating the line which issues the secondary transfer ticket and with a portion $e$ which contains a list, alphabetically arranged, of all of the lines to which it issues transfers. This list will usually include a number of the lines of the main list, with their designating numerals, and, of course, will include the line issuing the primary transfer ticket. The reverse side of the secondary transfer ticket may conveniently indicate to the passenger, as shown, the points at which he may have a still further transfer, without paying additional fare.

In view of the preceding description, the use of the system, for the purposes of the invention, will be apparent. For instance, let us assume that the passenger desires to proceed from a point $f$ (Fig. 1) on Bushwick avenue to a point $n$ on Broadway. Upon paying a cash fare to the conductor of the Bushwick avenue car, he receives from the conductor the primary transfer ticket represented in Fig. 2. Upon examining the ticket, he finds in the itinerary list the Broadway line and opposite "Broadway" he finds a series of numbers corresponding to numbers in the main list. An inspection of the main list shows him which one of these numbers corresponds to the line of the main list intersecting the Bushwick avenue line nearest the street where he entered the Bushwick avenue car; as, for instance, the Graham avenue line. He, therefore, leaves the Bushwick avenue car at its intersection with the Graham avenue line and presents the primary transfer ticket to the conductor of the Graham avenue line. The conductor of the Graham avenue line thereupon registers the primary transfer ticket and issues to the passenger the secondary transfer ticket shown in Fig. 3, at the same time punching from the secondary ticket the numeral opposite the name of the Bushwick avenue line, thereby preventing its re-use upon the Bushwick avenue cars. When the passenger reaches the intersection of the Graham avenue line with the Broadway line, he still has in his possession the secondary transfer ticket, and is able to present it to the conductor of the Broadway line, who collects and registers it. The passenger is thus enabled to reach his destination on Broadway by the nearest obvious route and is then deprived of a further opportunity to use the lines of the system issuing the primary transfer except upon the payment of an additional cash fare, and, in the meantime, the conductor who has collected the cash fare, the conductor who has collected the primary transfer ticket, and the conductor who has collected the secondary transfer ticket, have each made a corresponding record upon the appropriate register, and must produce a physical or tangible evidence of each registration either in the form of cash or in the form of a transfer, as the case may be, thereby preserving the advantages of a registering system.

Having thus described my invention, what I claim is:—

A primary transfer ticket for urban and suburban passenger traffic, bearing the following indications:—the name of the issuing line; a main list of names designating the lines to which the issuing line directly transfers at points of intersection or junction; a secondary list of names, designating the lines to which one or more of the directly transferring lines of the main list transfer; the lines of the main list having individual designating numerals and each of the secondary list having opposite it numerals corresponding in signification to the individual designating numerals of the lines of the main list to which it transfers, the said primary transfer ticket bearing matter explaining that the characters following the name of a car line in the secondary list denote car lines which connect the issuing lines with the car line named; in combination with a secondary transfer ticket, bearing the name of the line issuing it, and bearing a list of the names and designating numerals of the lines to which it transfers, among which is included the name and designating numeral of the line issuing the primary transfer ticket; substantially as described.

In testimony whereof I affix my signature, in presence of two witnesses.

CHARLES D. MENEELY.

Witnesses:
 JOHN C. PENNIE,
 LAURA B. PENFIELD.